United States Patent
Nichols

(10) Patent No.: US 6,259,403 B1
(45) Date of Patent: *Jul. 10, 2001

(54) GPS POSITIONING UTILIZING LASER BASED REFLECTORS AUGMENTATION

(75) Inventor: Mark Edward Nichols, Sunnyvale, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/370,409

(22) Filed: Aug. 9, 1999

(51) Int. Cl.$^7$ ............... G01S 5/02; H04B 7/185
(52) U.S. Cl. ........................................ 342/357.14
(58) Field of Search ............................. 342/357.14

(56) References Cited

U.S. PATENT DOCUMENTS 5,949,371 * 9/1999 Nichols .................. 342/357.01

* cited by examiner

Primary Examiner—Thomas H. Tarcza
Assistant Examiner—Fred H Mull
(74) Attorney, Agent, or Firm—Boris G. Tankhilevich

(57) ABSTRACT

The mobile unit equipped with the satellite positioning system augmented by the laser positioning system is disclosed. The usage of the satellite positioning system allows the user to determine the coordinate of the laser reflectors prior to the range measurements. The range measurements are performed by the navigational computer using the laser scanning and rotating beam to obtain the range data between the mobile unit and a plurality of laser reflectors, and using the satellite positioning system to obtain the range data between the mobile unit and a plurality of visible navigational satellites. The obtained range data and the laser reflector coordinate data allows the user to perform the navigation of the mobile unit.

14 Claims, 4 Drawing Sheets

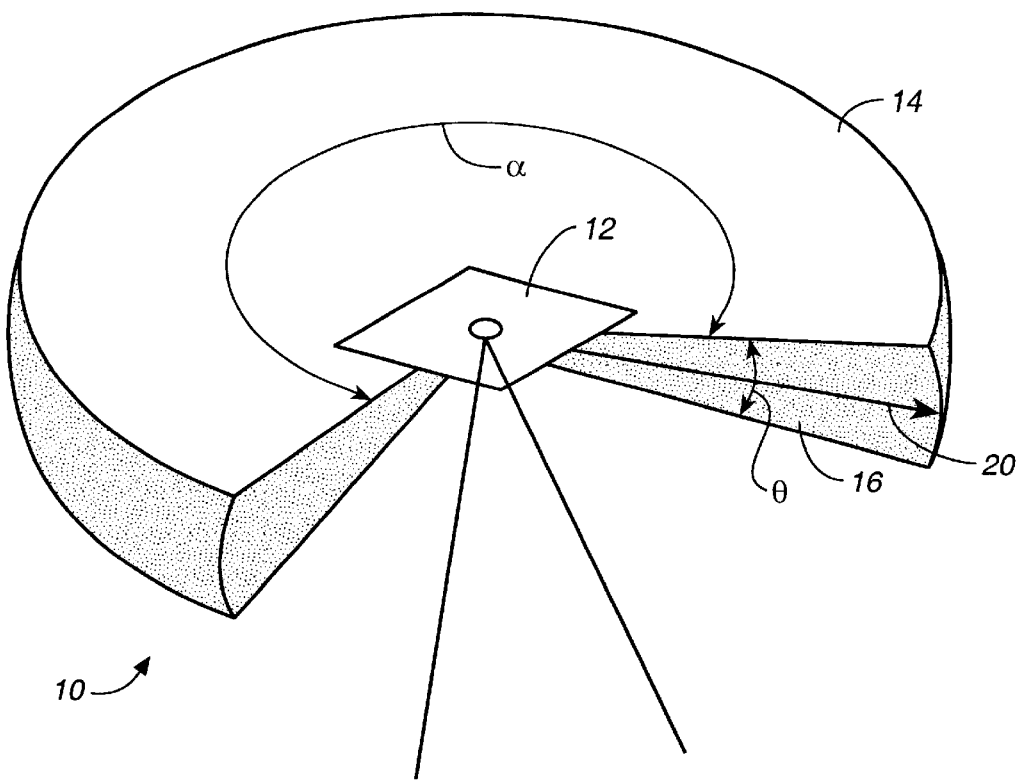
FIG._1
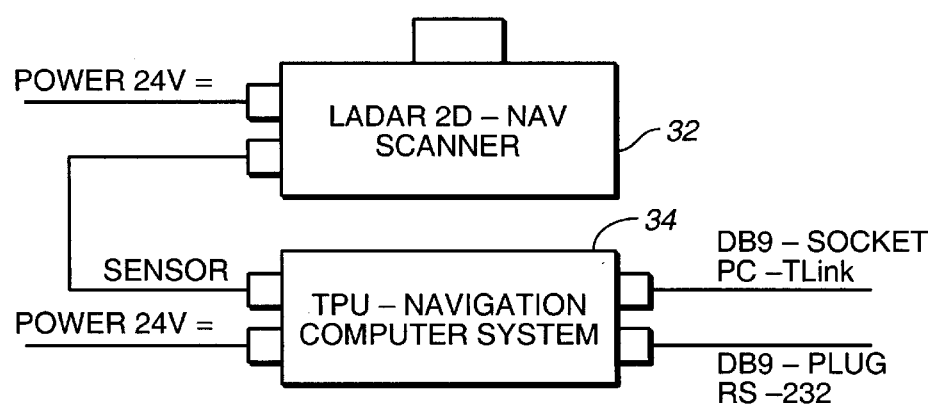
FIG._2

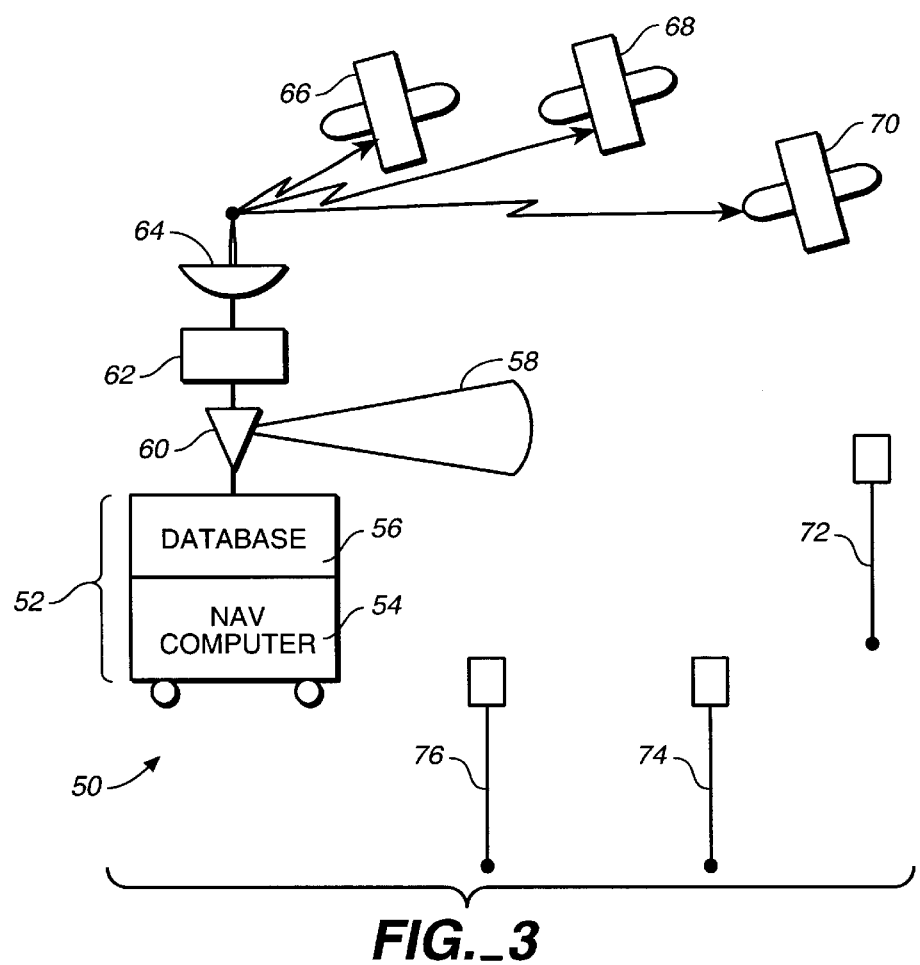
FIG._3
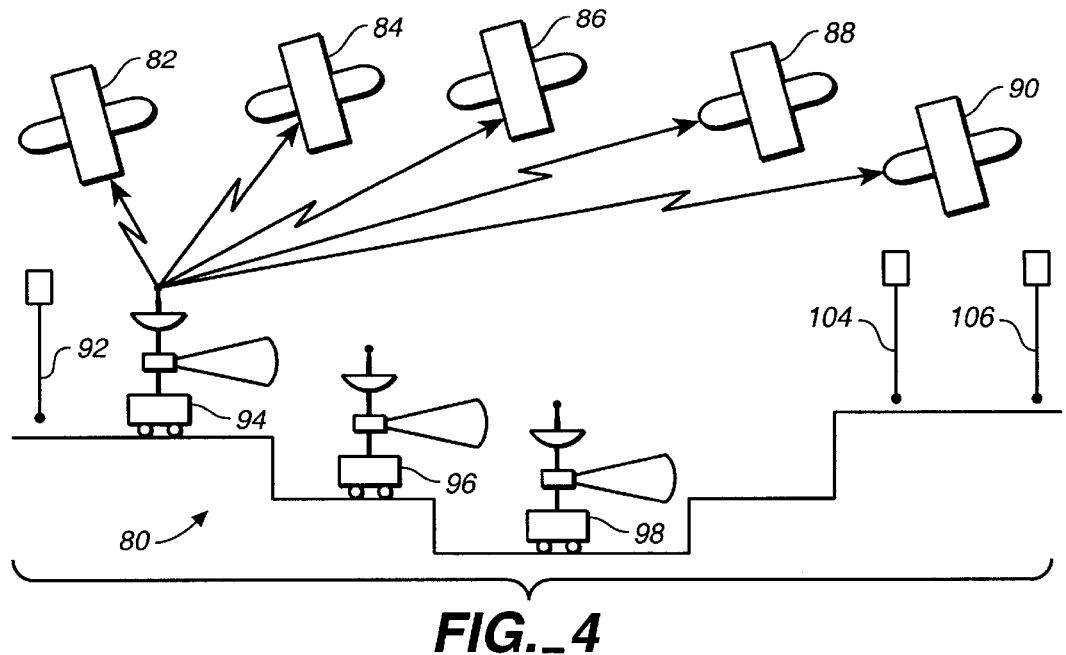
FIG._4

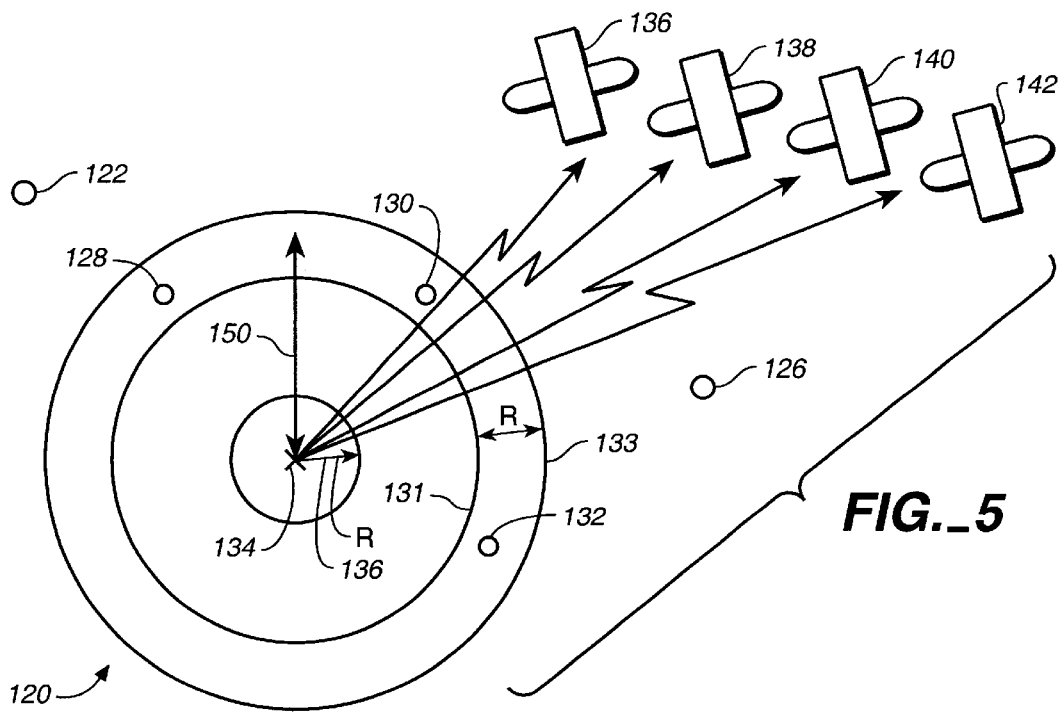
FIG._5
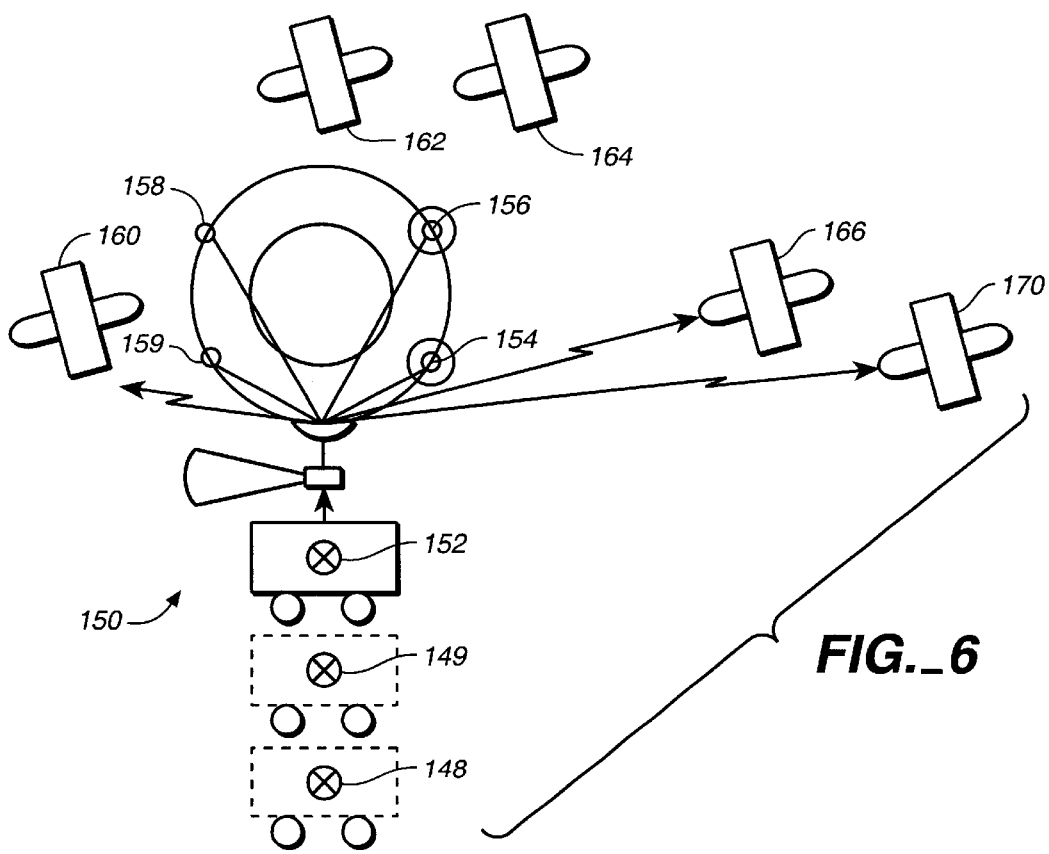
FIG._6

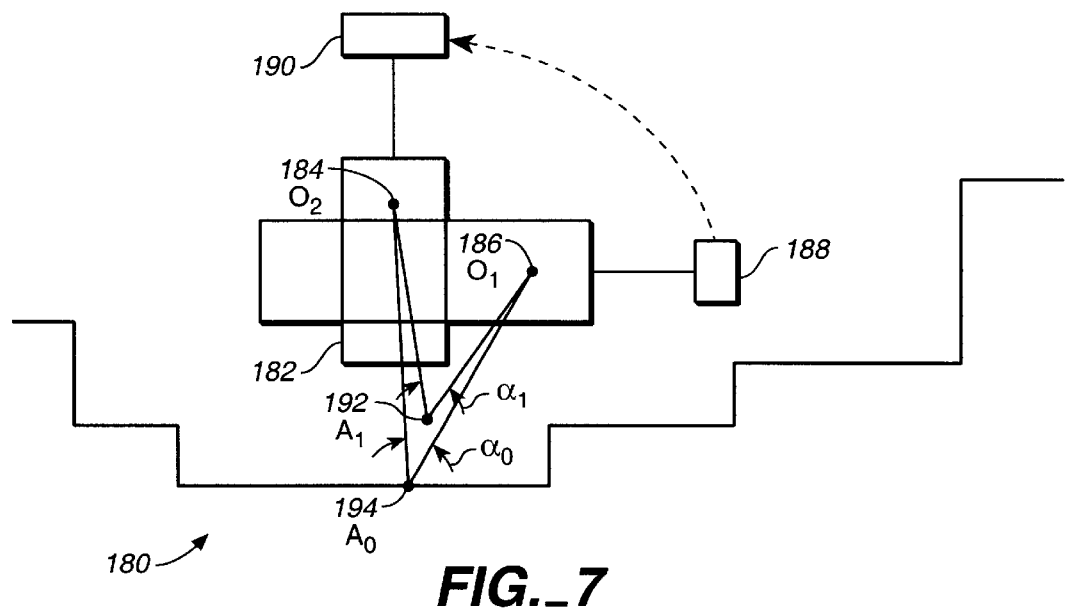
FIG._7
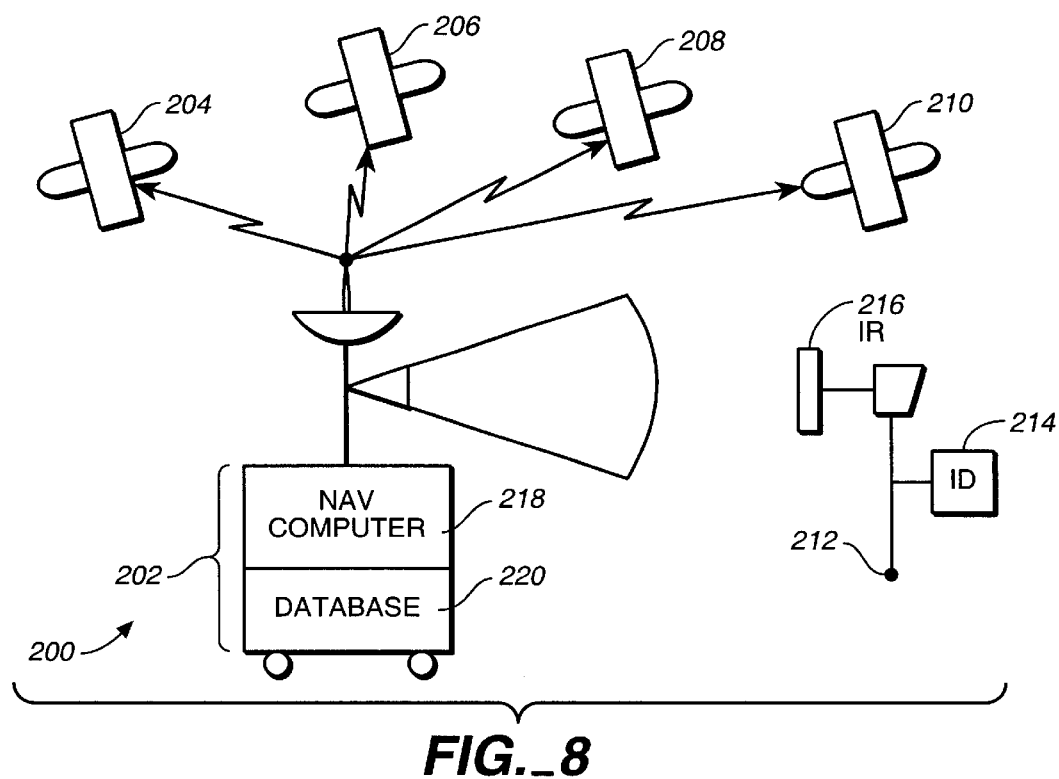
FIG._8

GPS POSITIONING UTILIZING LASER BASED REFLECTORS AUGMENTATION

This is a continuation of the U.S. Patent application entitled "LASER BASED REFLECTORS FOR GPS POSITIONING AUGMENTATION", U.S Pat. No. 5,949,371 A, filed on Jul. 27, 1998.

BACKGROUND

The three dimensional position coordinates of a mobile object can be determined in a variety of ways. In recent years, the global positioning satellite (GPS) receivers and the receivers that use the alternative satellite systems, like GLONASS system, came of age and began to proliferate widely. An autonomous navigational system that includes a satellite receiver and a navigational computer can achieve the 10-meter level of accuracy in the position determination of a mobile object.

The differential navigation systems that utilize the differential corrections in addition to the satellite signals can determine the positional information with the meter-range accuracy. The real-time kinematic (RTK) GPS systems that are capable of utilizing in real time not only code but also carrier information transmitted from satellites can achieve the centimeter level of accuracy in the position determination of a mobile object.

Recently, the alternative laser based navigational systems were developed by a number of companies. For instance, the IBEO Lasertechnik, based in Hamburg, Germany, developed a Ladar 2D navigational sensor system that is capable of navigating a mobile unit equipped with a scanning and rotating laser beam and a navigational computer. The laser beam is reflected by a number of laser reflectors placed in positions with known coordinates. The Ladar 2D navigational system determines the ranges between the mobile unit and the laser reflectors that reflect the laser beam illuminating them. By solving the simple geometric equations, the navigational computer can determine the mobile unit 2D position coordinates and navigate the mobile unit in real time with accuracy up to 2 cm.

However, the laser reflectors have to be placed in the locations with known coordinates for the laser positioning system to become operational. This requires that the survey of the laser reflectors be performed independently from the navigation of the mobile unit.

What is needed is a satellite navigational system augmented by a laser positioning system that is capable of surveying the laser reflectors and navigation of the mobile unit at the same time.

SUMMARY

The current patent application is novel and unique because it discloses a satellite navigational system augmented by a laser positioning system that is capable of surveying the laser reflectors and navigation of the mobile unit at the same time.

One aspect of the present invention is directed to a positioning system comprising a mobile unit and a plurality of targets further comprising a plurality of visible targets. The mobile unit detects a range information between the mobile unit and each of the visible targets and utilizes the range information to calculate its positional information.

In one embodiment, the mobile unit further comprises: (a) a scanning and rotating laser beacon generating a laser beam; and (b) a satellite positional system (SATPS) further comprising a SATPS receiver; and an integrated laser/SATPS navigational computer.

In one embodiment, the plurality of targets further comprises a plurality of visible GPS satellites, and a plurality of visible laser reflectors placed in locations with known coordinates.

In one embodiment, the plurality of GPS satellites further comprises at least two visible GPS satellites, and the plurality of laser reflectors further comprises at least two visible stationary laser reflectors located in known and fixed positions. The integrated laser/GPS navigational computer utilizes range information between the mobile unit and each visible GPS satellite, and range information between the mobile unit and each visible laser reflector to obtain the mobile unit three-dimensional positional information.

The integrated laser/GPS navigational computer further comprises a database system capable of storing the coordinates of each laser reflector which is used by the integrated laser/GPS navigational computer for identifying each visible laser reflector.

In one embodiment, the plurality of laser reflectors further comprises at least two visible laser reflectors located in known and fixed positions ("known visible laser reflector") and at least one visible laser reflector located in a position with unknown position coordinates ("unknown visible laser reflector").

The mobile unit utilizes the range data between the mobile unit and each visible GPS satellite, and between the mobile unit and each visible known laser reflector obtained in at least three consecutive measurements to perform surveying operation of each visible unknown laser reflector and to obtain the mobile unit position coordinates. This allows the user of mobile unit to add each surveyed laser reflector to the set of laser reflectors used for navigation purposes.

In another embodiment of the present invention, each visible laser reflector placed in a position with known coordinates further comprises a laser reflector identification information (ID), and an intelligent reflector (IR) capable of providing its ID upon reflecting the laser beam. The integrated navigational computer utilizes the stored coordinates of each visible laser reflector, the reflector ID information, and the obtained range data between the mobile unit and each visible laser reflector to identify each visible laser reflector.

Another aspect of the present invention is directed to a method of navigation of a mobile unit. The method comprises the steps of: (a) obtaining the range information between the mobile unit and a plurality of visible targets placed in locations with known coordinates, and (b) utilizing the range information for navigation of the mobile unit.

In one embodiment, the step of obtaining the range information further includes the steps of: (a) determining the range data between the mobile unit and at least two visible laser reflectors with known position coordinates, and (b) determining the range data between the mobile unit and at least two visible navigational satellites to achieve the three-dimensional navigation of the mobile unit.

In one embodiment, the step of utilizing the range information for three-dimensional navigation of the mobile unit further includes the steps of: (a) placing at least one visible laser reflector in a visible location with unknown coordinates, (b) determining three-dimensional coordinates of the mobile unit in at least three consecutive locations, (c) determining three-dimensional coordinates of each visible unknown laser reflector, (d) making a new set of visible laser reflectors utilized for three-dimensional navigation purposes by replacing one visible known laser reflector by one visible unknown laser reflector, and (e) determining the three-dimensional coordinates of the mobile unit by measuring the range data between the mobile unit and each visible satellite, and by measuring the range data between the mobile unit and each visible laser reflector using the new set of visible laser reflectors.

BRIEF DESCRIPTION OF DRAWINGS

FIG. 1 depicts a light beacon that emits a rotating and scanning laser beam that covers a three dimensional area.

FIG. 2 shows a block diagram of the laser positioning system LADAR.

FIG. 3 illustrates a positioning system of the present invention.

FIG. 4 depicts the usage of the GPS positioning system augmented by the laser positioning system for navigation of a mobile unit in a multi-level mine terrain with a variable number of visible satellites.

FIG. 5 shows the capability of the GPS positioning system augmented by the laser positioning system to identify each visible laser reflector.

FIG. 6 depicts the self-surveying capability of the GPS positioning system augmented by the laser positioning system.

FIG. 7 illustrates the self-surveying mode of operation with the optimum location of an unknown visible laser reflector.

FIG. 8 shows the GPS positioning system augmented by the laser positioning system employing a plurality of intelligent laser reflectors.

FULL DESCRIPTION OF THE PREFERRED EMBODIMENTS.

FIG. 1 shows a laser beacon (10) that is capable of generating a laser beam (20) that covers the three-dimensional area (10). The area (10) has a vertical (16) angular window θ<180 degrees and a horizontal (12) angular window β=360 degrees.

The laser beam (20) of FIG. 1 can be generated using a rotating laser system with a scanning feature.

Rotating lasers were introduced about twenty-five years ago. The rotating laser system can be implemented when a laser spins in the horizontal plane, or Z-plane, and provides an accurate reference plane with a millimeter accuracy. The rotating laser emits a laser beam. However, to detect and get benefit of the rotating laser beam, the potential user has to be located within vertical range. The user has to be equipped with the laser receiver capable of receiving the rotating laser beam. The rotating laser beam can be rotated mechanically or optically. In the mechanic embodiment, the motor physically rotates the laser and accordingly the laser beam. In the optical embodiment, the mirror rotates in such a way that the physically non-rotating laser emits the rotating laser beam.

A fan (scan) laser system generates a continuously scanning laser beam in vertical plane within a certain angle window. The scanning laser beam can be scanned mechanically or optically. In the mechanic embodiment, the motor physically scans the laser and accordingly the laser beam. In the optical embodiment, the mirror scans in such a way that the physically non-scanning laser emits the scanning laser beam.

The scanning laser system can be used to measure the angular coordinates and distance from the scanning laser system to the target. One application is a robotics vision, another application is a collision avoidance system.

The SchwartzElectro Optics (SEO), Orlando, Fla., manufactures scanning (fan) laser systems.

Topcon Laser Systems, Inc., located in Pleasanton, California, manufactures a smart rotating laser system RL-S1A with a scanning feature. The user can receive the laser beam with the SmartCard target and draw the scan to any width for optimum beam brightness. This laser system has 633 nm visible diode as a laser source. The horizontal self leveling range is (+/−) 10 arc minutes. The vertical self leveling range is also (+/−) 10 arc minutes. The horizontal accuracy is (+/−) 15 arc seconds. The vertical accuracy is (+/−) 20 arc seconds. Operating range (diameter) with scanning target is 200 ft (60 m), with LS-50B receiver is 100 ft (300 m).

FIG. 2 illustrates a laser positioning system (LSP) LADAR (30) that is manufactured by IBEO Lasertechnik, based in Hamburg, Germany. The LADAR NAV navigational system (30) includes a Ladar 12D-NAV laser scanner system (32) configured to generate a rotating and scanning laser beam within the angular range of (5–65) degrees that is reflected from a plurality of laser reflectors placed in positions with known coordinates. The range information between the LADAR scanner and each laser reflector can be determined by measuring the time that is needed for a laser beam to travel between the LADAR scanner and a laser reflector.

The standard laser reflector reflects the light (or infrared beam) back to the laser beacon. The standard laser reflector should have the following properties: (1) good reflectivity, (2) complete illumination of the receiver optics, and (3) no change direction of the emerging rays through small movements of the reflecting device, thus rendering a continuous alignment unnecessary.

The standard laser reflector can comprise: (1) a plane surface mirror, (2) a spherical reflector, (3) a solid glass prism reflector (corner cube reflector), (4) a hollow corner cube reflector, (5) an acrylic retroreflector, or (6) a reflective sheeting.

According to the specification, the LADAR has the position accuracy less than 2 cm and the position update frequency 10 Hz.

The LADAR system has its limitations. First of all, all laser reflectors have to be visible to the laser scanner. Secondly, the laser reflectors have to be placed in positions with known coordinates, that is the laser reflectors have to be independently surveyed in advance before the navigational system (30) of FIG. 2 can become operational.

There are several well known satellite based navigational systems. In one embodiment, the satellite based navigational system comprises the GPS (global positioning system).

The GPS is a system of satellite signal transmitters, with receivers located on the Earth's surface or adjacent to the Earth's surface, that transmits information from which an observer's present location and/or the time of observation can be determined.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=10.23 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes a complete information about the transmitting satellite within next several hours of transmission) and an a chance for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

In another embodiment, the satellite based positioning system comprises a Global Navigational System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+ 9k/16) GHz and f2=(1.246+7k/16) GHz, where k (=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

A satellite positioning system (SATP), such as the GPS, the GLONASS, or the combination of GPS and GLONASS systems uses transmission of coded radio signals, with the structure described above, from a plurality of Earth-orbiting satellites. An SATP antenna receives SATP signals from a plurality (preferably four or more) of SATP satellites and passes these signals to an SATP signal receiver/processor, which (1) identifies the SATP satellite source for each SATP signal, (2) determines the time at which each identified SATP signal arrives at the antenna, and (3) determines the present location of the SATP satellites.

The range (Ri) between the location of the i-th SATP satellite and the SATP receiver is equal to the speed of light c times ($\Delta$ti), wherein ($\Delta$ti) is the time difference between the SATP receiver's clock and the time indicated by the satellite when it transmitted the relevant phase. However, the SATP receiver has an inexpensive quartz clock which is not synchronized with respect to the much more stable and precise atomic clocks carried on board the satellites. Consequently, the SATP receiver actually estimates not the true range Ri to the satellite but only the pseudo-range (ri) to each SATP satellite.

After the SATP receiver determines the coordinates of the i-th SATP satellite by picking up transmitted ephemeris constants, the SATP receiver can obtain the solution of the set of the four equations for its unknown coordinates ($x_0$, $y_0$, $z_0$) and for unknown time bias error (cb). The SATP receiver can also obtain its heading and speed. (See *The Navstar Global Positioning System*, Tom Logsdon, Van Nostrand Reinhold, 1992, pp. 8–33, 44–75, 128–187). The following discussion is focused on a GPS receiver, though the same approach can be used for a GLONASS receiver, for a GPS/GLONASS combined receiver, or any other SATP receiver.

FIG. 3 depicts a positioning system (50) that is the subject matter of the present invention.

The idea behind this invention is to augment a satellite navigational system by a laser positioning system (30) of FIG. 2 and to use the augmented system for navigation of the mobile unit.

Indeed, the usage of the satellite positioning system allows the user to coordinate the positions of the visible laser reflectors and to determine the position coordinates of the mobile unit at the same time, thus avoiding the time consuming advance surveying operation of the laser reflectors.

On the other hand, the usage of the laser positioning system allows the user to determine its position coordinates even when the number of visible navigational satellites is less than minimum (three).

In one embodiment, the positioning system (50) comprises a mobile unit (52) including a scanning and rotating laser beacon (60) generating a laser beam (58) and a satellite positional system (SATPS) further comprising a SATPS receiver (62), and a satellite antenna (62).

In another embodiment, the positioning system (50) comprises the mobile unit (52) and a plurality of targets further comprising a plurality of visible targets.

An integrated laser/SATPS navigational computer (54) can be used by both the laser positioning subsystem and the satellite positioning subsystem of the navigational system (50).

In one embodiment, the plurality of visible targets further comprises a plurality of visible SATPS satellites (66, 68, 70) and a plurality of visible laser reflectors (72, 74, and 76) placed in positions with known coordinates. To coordinate the positions of the laser reflectors the user can utilize one of two methods: the independent survey method or the self-survey method (see discussion below).

The mobile unit (52) utilizes its laser beam (58) to obtain the range information between the mobile unit and each visible laser reflector, and utilizes its satellite receiver to obtain the range information between the mobile unit and each visible SATPS satellite. The integrated laser/SATPS navigational computer (54) utilizes the range data and the known position coordinates of the visible laser reflectors to calculate the coordinates of the mobile unit. (See discussion below).

The plurality of visible SATPS satellites can comprise a plurality of visible GPS satellites, a plurality of visible GLONASS satellites, a plurality of combined GPS/GLONASS satellites, or any other plurality of navigational satellites.

In one embodiment, a plurality of visible navigational satellites can be substituted by a plurality of stationary pseudolites.

In the preferred embodiment, the plurality of visible satellites comprises a plurality of visible GPS satellites, the SATP receiver (62) comprises a GPS receiver, and the SATP antenna (64) comprises a GPS antenna.

In one embodiment, when the accuracy of the mobile unit position measurement is not important, the GPS receiver (62) can comprise an autonomous GPS receiver that can be implemented using a single frequency 4600 LS GPS TRIMBLE receiver. The autonomous receiver utilizes the absolute positioning method to obtain its position with an accuracy of 10–100 meters.

In another embodiment, when the accuracy of the mobile unit position measurement is important, the GPS receiver (62) can comprise a differential GPS receiver. In this embodiment, a configuration of two or more receivers can be used to accurately determine the relative positions between the receivers or stations. In differential position determination, many of the errors in the GPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms.

The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

In one embodiment, the differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With proper equipment, a relative accuracy of 5 meters should be possible at distances of a few hundred kilometers from the Base Station.

In another embodiment, the differential GPS receiver can be implemented using a TRIMBLE Ag GPS -132 receiver that obtains the differential corrections from the U.S. Cost Guard service free in 300 kHz band broadcast. The accuracy of this differential GPS method is about 50 cm.

In one more embodiment, the differential corrections can be obtained from the Wide Area Augmentation System (WAAS). The WAAS system includes a network of Base Stations that uses satellites (initially geostationary satellites—GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm.

The WAAS provides the differential corrections free of charge to a WAAS-compatible user. The accuracy of this method is less than 1 meter.

In one more embodiment, three satellite commercial services that broadcast the differential corrections can be used: (1) Omnistar, (2) Racal, (3) Satloc, and (4) the satellite system operated by the Canadian Government. The accuracy of this method is (10 50) cm.

In one more embodiment, the real time kinematic (RTK) differential GPS receiver can be used to obtain the position locations with less than 2 cm accuracy. The RTK differential GPS receiver receives the differential corrections from a Base Station placed in a know location within (10–50) km from the local user.

For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19(or 24) centimeters, which is an unacceptable error for the centimeter-level accuracy measurements.

Referring back to FIG. 3, in one embodiment, the plurality of GPS satellites further comprises at least two visible GPS satellites, and the plurality of laser reflectors further comprises at least two visible laser reflectors located in known and fixed positions.

In this embodiment, the integrated laser/GPS navigational computer (54) can determine its three-dimensional (3-D) position coordinates $(x_0, y_0, z_0)$ by measuring the range data $(R_1, R_2, R_3, R_4)$ between the mobile unit (52) and at least two laser reflectors placed in positions (74, 76) with known coordinates $(x_{1L}, y_{1L}, z_{1L})$, $(x_{2L}, y_{2L}, z_{2L})$, and at least two GPS satellites (66, 68) that transmit their position coordinates $(x_{3S}, y_{3S}, z_{3S})$ and $(x_{4S}, y_{4S}, z_{4S})$ via the satellite signals:

$$(x_0-x_{1L})^2+(y_0-y_{1L})^2+(z_0-z_{1L})^2=R_1^2 \quad (1)$$

$$(x_0-x_{2L})^2+(y_0-y_{2L})^2+(z_0-z_{2L})^2=R_2^2 \quad (2)$$

$$(x_0-x_{3S})^2+(y_0-y_{3S})^2+(z_0-z_{3S})^2=R_3^2 \quad (3)$$

$$(x_0-x_{4S})^2+(y_0-y_{4S})^2+(z_0-z_{4S})^2=R_4^2 \quad (4)$$

The equations Eqs.(1–3) are quadratic, therefore they yield two solutions $(x'_0, y'_0, z'_0)$ and $(x''_0 y''_0 z''_0)$, one of them a false solution. To choose the true solution between these two solutions we need an extra equation (Eq.4).

The equations Eqs. (1–4) demonstrate the first unique feature of the present mvention, that is the navigational computer (54 of FIG. 3) can build the set of navigational equations for both satellite targets and laser reflector targets and can utilize the solution of these equations Eqs. (1–4) for (3-D) navigation of the mobile unit.

In another embodiment, the plurality of GPS satellites comprises at least two visible GPS satellites (66, 68), and the plurality of laser reflectors comprises at least one visible laser reflector located in a known and fixed position (74).

In this embodiment, the integrated laser/GPS navigational computer (54) can determine its two-dimensional (2-D) position coordinates $(x_0,y_0)$ by measuring the range data $(R_1, R_2, R_3)$ between the mobile unit (52) and reflector (74) placed in positions with known coordinates $(x_{1L}, y_{1L})$, and at least two GPS satellites (66, 68) that transmit their position coordinates $(x_{3S}, y_{3S})$ and $(x_{2S}, y_{2S})$ via the satellite signals:

$$(x_0-x_{1L})^2+(y_0-y_{1L})^2=R_1^2 \quad (5)$$

$$(x_0-x_{2S})^2+(y_0-y_{2S})^2=R_2^2 \quad (6)$$

$$(x_0-x_{3S})^2+(y_0-y_{3S})^2=R_3^2 \quad (7)$$

Again, because equations Eqs. (5–6) are quadratic they yield two solutions $(x'_0, y'_0)$ and $(x''_0, y''_0)$, one of them a false solution. To choose the true solution between these two solutions we need an extra equation Eq. (7).

The equations Eqs. (5–7) also demonstrate the first unique feature of the present invention, that is the navigational computer (54 of FIG. 3) can build a set of navigational equations for both satellite and laser reflector targets and can utilize the solution of equations Eqs. (5–7) for (2-D) navigation of the mobile unit.

In one example, FIG. 4 depicts the usage of the GPS positioning system augmented by the laser positioning system of FIG. 3 for navigation of a mobile unit in a multi-level mine terrain with a variable number of visible satellites.

Let us assume, that, initially, the mobile unit equipped with the GPS and laser positioning subsystems is located in a position (94) where its GPS antenna can receive the satellite signals from at least five GPS satellites. The five GPS satellite signals provide enough information for the navigational computer (54 of FIG. 3) to obtain the position coordinates of the mobile unit and to coordinate the locations of laser reflectors (102, 104, 106). The coordinates of each laser reflector can be stored in a database system (56 of FIG. 3).

Moving further into the mine terrace the mobile unit arrives into position (96). Let us assume that in this position the GPS antenna can see at least four GPS satellites that provide enough data for the navigational computer (54 of FIG. 3) to obtain the position coordinates of the mobile unit.

Let us assume, however, that when the mobile unit arrives into position (98), the GPS antenna can receive the satellite signals only from three visible GPS satellites.

At this point, the navigation computer can augment the satellite positioning system by the laser system and employ the laser beam to obtain the range data between the mobile unit and the laser reflectors (102, 104, and 106) located in known positions that are surveyed in advance when the mobile unit was in position (94) (as was discussed above). Thus, the mobile unit in position (98) can obtain its position coordinates by employing both the satellite range data and the laser reflector range data and using Eqs. (1–7).

In another mode of operation, let us assume that the position coordinates of all visible laser reflectors are known in advance and stored in the database (56 of FIG. 3) of the integrated laser/GPS navigational computer (54 of FIG. 3).

As shown in FIG. 5, in this mode of operation, the mobile unit located in position (134) is capable of identifying each visible laser reflector by using the range information between the mobile unit and each visible laser reflector and the stored coordinates of each visible laser reflector.

Let us also assume that the mobile unit can determine its position coordinates at location (134) with some accuracy R using the GPS satellite signals emanating from at least four visible GPS satellites (136, 138, 140, and 142).

In one embodiment, the GPS receiver can comprise an autonomous receiver and can obtain its position coordinates with accuracy R of 10–100 meters (as was discussed above).

In another embodiment, when the accuracy of the mobile unit position measurements is important, the GPS receiver (62 of FIG. 3) can comprise a differential GPS receiver that can obtain its position coordinates with accuracy R of few centimeters in absolute terms.

Thus, the mobile unit can determine its position coordinates by using the GPS subsystem within a circle with radii R (136).

Using the laser positioning subsystem the mobile unit can determine also the range data Laser_Range (150) between the mobile unit located in the position (134) with known coordinates and at least one visible laser reflector with accuracy R (136). This means that the measured range (150) can be used to locate a laser reflector only somewhere within two circles (131 and 133) separated by the distance R.

Thus, all the user knows after the laser range measurements are done is that at least one laser reflector is located somewhere (128, 130, or 132) within two circles (131, 133).

Using the coordinates of all laser reflectors stored in the database (56 of FIG. 3), the user has certain probability to identify at least one location (128, 130, or 132) with coordinates that matches the coordinates of at least one laser reflector stored in the database. The larger the ratio of the Laser-Range (150) to the satellite navigation error R (136), the greater the probability of positive identification of at least one laser reflector located within these two circles (131 and 133).

The timing of the laser measurement should be synchronized with a GPS clock because we deal with real time measurements in a dynamic environment. For instance, one pulse per second output from the GPS receiver can provide a GPS clock.

Thus, the given-above discussion of FIG. 5 demonstrates the second unique feature of the satellite positioning system augmented by the laser positioning system, that is its ability to utilize the GPS receiver to identify what particular laser reflector the user can observe and use for the further navigational purposes (see discussion below).

FIG. 6 depicts the third unique feature of the present invention of the satellite positioning system augmented by the laser positioning system, that is its self-surveying capability.

Let us assume, that the mobile unit (152) equipped with the laser and satellite navigational subsystems can observe at least two visible GPS satellites (160), and (166), and at least two visible laser reflectors (159, 158) placed in locations surveyed in advance, that is with known position coordinates, ("known visible laser reflectors"), and at least one visible laser reflector located in a position (154) with unknown position coordinates ("unknown visible laser reflector").

The navigational computer can utilize the range data between the mobile unit and each visible GPS satellite (160, 166), and the range data between the mobile unit and each visible known laser reflector (158, 159) in order to determine the mobile unit three-dimensional position coordinates according to Eqs.(1–4). The navigational computer can perform these measurement in at least three different locations (148, 149, 152). The navigational computer can utilize the laser beam to measure the range data between the mobile unit and the unknown visible laser reflector (154) three times in at least three different locations (148, 149, 152). The navigational computer can utilize its threedimensional position coordinates measured in at least three different locations (148, 149, 152) and the range data between the mobile unit placed in these three different locations (148, 149, 152) and the visible unknown laser reflector (154) to determine the three-dimensional coordinates of the visible unknown laser reflector (154). Thus, the initially "unknown" laser reflector (154) becomes a "known" laser reflector.

The (3-D) coordinates of the initially unknown visible laser reflector (154) can be added to the database (56 of FIG. 3) including the (3-D) coordinates of all known laser reflectors.

Later on, when the mobile unit looses the sight of one of known laser reflectors or one of visible satellites, the navigational computer can add the (3-D) coordinates of the laser reflector (154) to the database of all visible targets for its further (3-D) navigational purposes.

This self-surveying capability allows the user sitting in the mobile unit equipped with the laser and satellite positioning subsystems to navigate the mobile unit and to perform the survey operation of the laser reflectors at the same time.

In another embodiment, the plurality of GPS satellites also comprises at least two visible GPS satellites (160, 166), but the plurality of laser reflectors comprises at least one visible known laser reflector (159) and at least one visible unknown laser reflector (154).

The navigational computer can utilize the range data between the mobile unit and each visible GPS satellite (160, 166), and the range data between the mobile unit and the single visible known laser reflector (159) in order to determine the mobile unit two-dimensional position coordinates according to Eqs. (5–7). The navigational computer can perform these measurement in at least two different locations (149, 152). The navigational computer can utilize the laser beam to measure the range data between the mobile unit and the unknown visible laser reflector (154) two times in at least two different locations (149, 152). The navigational computer can utilize its two-dimensional position coordinates measured in at least two different locations (149, 152) and the range data between the mobile unit placed in these two different locations (149, 152) and the visible unknown laser reflector (154) to determine the two-dimensional coordinates of the visible unknown laser reflector (154). Thus, the initially "unknown" laser reflector (154) becomes a "known" laser reflector.

The (2-D) coordinates of the initially unknown visible laser reflector (154) can be added to the database (56 of FIG. 3) including the (2-D) coordinates of all known visible laser reflectors.

Later on, when the mobile unit looses the sight of one of known laser reflectors or one of visible satellites, the navigational computer can add the (2-D) coordinates of the laser reflector (154) to the database of all visible targets for its further (2-D) navigation purposes.

Yet, in one more embodiment of the present invention, the plurality of GPS satellites comprises at least three visible GPS satellites (160, 166, 170), but the plurality of laser reflectors comprises only one visible unknown laser reflector (154).

The navigational computer can utilize the range data between the mobile unit and each visible GPS satellite (160, 166, 170) in order to determine the mobile unit two-dimensional position coordinates according to standard satellite navigational equations. See *The Navstar Global Positioning System*, Tom Logsdon, Van Nostrand Reinhold, 1992, pp. 8–33, 44–75, 128–187).

The navigational computer can perform these measurement in at least two different locations (149, 152). The navigational computer can utilize the laser beam to measure the range data between the mobile unit and the unknown visible laser reflector (154) two times in at least two different locations (149, 152). Finally, the navigational computer can utilize its two-dimensional position coordinates measured in at least two different locations (149, 152) and the range data between the mobile unit placed in these two different locations (149, 152) and the visible unknown laser reflector (154) to determine two-dimensional coordinates of the visible unknown laser reflector (154). Thus, the initially "unknown" laser reflector (154) becomes a "known" laser reflector.

Again, the (2-D) coordinates of the initial unknown visible laser reflector (154) can be added to the database (56 of FIG. 3) including the (2-D) coordinates of all visible targets.

Later on, when the mobile unit looses the sight of one of the visible satellites (160, 166, or 170), the navigational computer can add the (2-D) coordinates of the laser reflector (154) to the database of all visible targets for its further (2-D) navigational purposes.

In the self-surveying mode of operation, there is an optimum location of the unknown visible laser reflector (192) as depicted in FIG. 7.

Indeed, the operator of the mobile unit (182 of FIG. 7) equipped with the laser and satellite positioning subsystems should place the laser reflector in the location (192) with initially unknown coordinates as close to the mobile unit as possible.

As an example, let us consider that the mobile unit (182) comprises an excavator that moves its shovel from the position (188) to the position (190). The navigational computer can perform the range measurements of the laser reflector (192) from two locations (184) and (186). The closer the laser reflector (192) to the mobile unit, the greater the angle $\alpha_1$. If the angle $\alpha_1$ is equal to 90°, the two measurements are independent and they yield the precise result for the coordinates of the location of the laser reflector (192).

On the other hand, if the laser reflector is located in the position (194) with the angle $\alpha_0$ that is close to 0°, the two measurements are dependent and they won't yield the precise result for coordinates of the laser reflector in location (194).

In one additional embodiment of the present invention, as depicted in FIG. 8, each visible laser reflector (212) placed in a position with known coordinates further comprises a laser reflector identification information (ID) (214) and an intelligent reflector (IR) (216) capable of providing the ID upon reflecting the laser beam. The integrated laser/GPS navigational computer (218) of the mobile unit (202) utilizes the stored in the database (220) coordinates of each visible laser reflector, the range data between the mobile unit and each visible laser reflector (212), and the laser reflector ID information (214) to identify each visible laser reflector (212).

The intelligent reflector (IR) (216) includes a standard laser reflector (not shown), a memory unit (not shown) that stores the identification number (ID) (214) of the mobile unit, and a processor (not shown).

When the laser beam illuminates the IR, the processor utilizes its clock to determine the time of illumination.

The distance between the laser beacon and the laser reflector (212) at the time of illumination can be determined by the simple computation. Indeed, if the clock of the intelligent reflector (IR) gives the timing information at the time of illumination that is transferred back to the laser beacon, then having another clock at the laser beacon one can determine the time period that laser beam spent travelling between laser beacon and the mobile unit back and forth. Dividing this time period by two and multiplying by the speed of light, one can determine the distance between the laser beacon and each mobile unit being illuminated.

For the full discussion of the intelligent laser reflector (IR) technology please see the U.S. patent application entitled "Three dimensional multi-unit laser control and tracking system", Ser. No. 09/083,404, filed on May 22, 1998, that is incorporated in the present patent application in its entirety.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An integrated satellite-laser positioning system comprising:
   a mobile unit further comprising:
      a scanning and rotating laser beacon generating a laser beam;
      a satellite positioning system (SATPS) further comprising
         a SATPS receiver; and
         a SATPS antenna; and
      an integrated SATPS/laser navigational computer; and
   a plurality of targets further comprising a plurality of laser reflectors;
   wherein said mobile unit collects a first set of range data between said mobile unit and each said target visible from said mobile unit;
   and wherein said mobile unit collects a second set of range data between said mobile unit and an each SATPS satellite visible from said mobile unit; said visible satellite comprising a visible satellite;
   and wherein said integrated SATPS/laser navigational computer utilizes said first set of range data and said second set of range data to obtain said mobile unit positional information.

2. The integrated satellite-laser positioning system of claim 1;
   wherein said SATPS further comprises:
      a GPS navigational system further comprising
         a GPS receiver; and a GPS antenna;
   and wherein said integrated SATPS/laser navigational computer further comprises:
      an integrated GPS/laser navigational computer;
   and wherein each said laser reflector visible from said mobile unit is placed in a location with known coordinates; said laser reflector visible from said mobile comprising a visible laser reflector;
   and wherein said integrated GPS/laser navigational computer utilizes range information between said mobile unit and each said GPS visible satellite, and range information between said mobile unit and each said visible laser reflector to obtain said mobile unit positional information.

3. The integrated satellite-laser positioning system of claim 2;
   wherein said plurality of GPS satellites further comprises:
      at least two GPS satellites visible from said mobile unit;
   and wherein plurality of laser reflectors further comprises:
      at least two stationary visible laser reflectors; wherein each said visible laser reflector is located in a known and fixed position;
   and wherein said integrated GPS/laser navigational computer utilizes range information between said mobile unit and each said visible GPS satellite, and range information between said mobile unit and each said visible laser reflector to obtain said mobile unit three-dimensional positional information.

4. The integrated satellite-laser positioning system of claim 3;
   wherein said integrated GPS/laser navigational computer further comprises:
      a database system capable of storing the coordinates of each said laser reflector; and wherein said integrated GPS/laser navigational computer is capable of identifying each said visible laser reflector by using the range information between said mobile unit and each said visible laser reflector and the stored coordinates of each said laser reflector.

5. The integrated satellite-laser positioning system of claim 2;
   wherein said plurality of GPS satellites further comprises:
      at least two GPS visible satellites;
   and wherein plurality of laser reflectors further comprises:

at least one stationary visible laser reflector, wherein each said visible laser reflector is located in a known and fixed position;

and wherein said integrated GPS/laser navigational computer utilizes range information between said mobile unit and each said visible GPS satellite, and range information between said mobile unit and each said visible laser reflector to obtain said mobile unit two-dimensional positional information.

6. The integrated satellite-laser positioning system of claim 2;

wherein said plurality of GPS satellites further comprises:
at least two visible GPS satellites;

and wherein plurality of laser reflectors further comprises:
at least two visible known laser reflector, wherein each said visible known laser reflector is located in a known and fixed position; and
at least one visible unknown laser reflector, wherein each said visible unknown laser reflector is located in a position with unknown position coordinates;

and wherein said mobile unit utilizes the range data between said mobile unit and each said visible GPS satellite, and the range data between said mobile unit and each said visible known laser reflector in order to determine said mobile unit three-dimensional position coordinates; and wherein said mobile unit utilizes its three-dimensional position coordinates measured in at least three different locations and the range data between said mobile unit placed in at least three different locations and each said visible unknown laser reflector to determine the three-dimensional coordinates of each said visible unknown laser reflector.

7. The integrated satellite-laser positioning system of claim 6; wherein said integrated GPS/laser navigational computer further comprises:
a database system capable of storing the coordinates of each said known visible laser reflector; and wherein said integrated GPS/laser navigational computer is capable of adding coordinates of each said visible unknown laser reflector to said database system.

8. The integrated satellite-laser positioning system of claim 2;

wherein said plurality of GPS satellites further comprises:
at least two visible GPS satellites;

and wherein plurality of laser reflectors further comprises:
at least one visible known laser reflector, wherein each said visible known laser reflector is located in a known and fixed position; and
at least one visible unknown laser reflector, wherein each said visible unknown laser reflector is located in a position with unknown position coordinates;

and wherein said mobile unit utilizes the range data between said mobile unit and each said visible GPS satellite, and the range data between said mobile unit and each said visible known laser reflector in order to determine said mobile unit two-dimensional position coordinates; and wherein said mobile unit utilizes its two-dimensional position coordinates measured in at least two different locations and the range data between said mobile unit placed in at least two different locations and each said visible unknown laser reflector to determine the two-dimensional coordinates of each said visible unknown laser reflector.

9. The integrated satellite-laser positioning system of claim 2;

wherein said plurality of GPS satellites further comprises:
at least three visible GPS satellites;

and wherein plurality of laser reflectors further comprises:
at least one visible unknown laser reflector, wherein each said visible unknown laser reflector is located in a position with unknown position coordinates;

and wherein said mobile unit utilizes the range data between said mobile unit and each said visible GPS satellite in order to determine said mobile unit position three-dimensional coordinates; and wherein said mobile unit utilizes its three-dimensional position coordinates measured in at least three different locations and the range data between said mobile unit placed in at least three different locations and each said visible unknown laser reflector to determine the three-dimensional coordinates of each said visible unknown laser reflector.

10. The integrated satellite-laser positioning system of claim 2;

wherein said plurality of GPS satellites further comprises:
at least two visible GPS satellites;

and wherein each said visible laser reflector placed in a position with known coordinates further comprises:
a laser reflector identification information (ID); and
an intelligent reflector (IR) capable of providing said ID upon reflecting said laser beam;

and wherein said integrated GPS/laser navigational computer utilizes said stored coordinates of each said visible laser reflector, each said visible laser reflector ID information, and said obtained range data between said mobile unit and each said visible laser reflector to identify each said visible laser reflector.

11. The integrated satellite-laser positioning system of claim 10;

wherein said integrated GPS/laser navigational computer further comprises:
a database system capable of storing the coordinates of each said laser reflector.

12. The integrated satellite-laser positioning system of claim 1;

wherein said SATPS further comprises:
a GLONASS navigational system further comprising a GLONASS receiver; and a GLONASS antenna;

and wherein said integrated SATPS/laser navigational computer further comprises:
an integrated GLONASS/laser navigational computer;

and wherein each said visible laser reflector is placed in a location with known coordinates;

and wherein said integrated GLONASS/laser navigational computer utilizes range information between said mobile unit and each said GLONASS visible satellite, and range information between said mobile unit and each said visible laser reflector to obtain said mobile unit positional information.

13. The integrated satellite-laser positioning system of claim 1;

wherein said SATPS further comprises:
a combined GPS/ILONASS navigational system further comprising
a combined GPS/GLONASS receiver; and a combined GPS/GLONASS antenna;

and wherein said integrated SATPS/laser navigational computer further comprises:
an integrated GPS/GLONASS/laser navigational computer;

and wherein each said visible laser reflector is placed in a location with known coordinates;

and wherein said integrated GPS/GLONASS/laser navigational computer utilizes range information between said mobile unit and each said GLONASS visible satellite, and range information between said mobile unit and each said visible laser reflector to obtain said mobile unit positional information.

14. The integrated satellite-laser positioning system of claim 1;

wherein said SATPS further comprises:

a GPS pseudolite navigational system further comprising a GPS pseudolite receiver; and a GPS pseudolite antenna;

and wherein said integrated SATPS/laser navigational computer further comprises:

a GPS pseudolite/laser navigational computer;

and wherein each said visible laser reflector is placed in a location with known coordinates;

and wherein said integrated GPS pseudolite/laser navigational computer utilizes range information between said mobile unit and each said GPS pseudolite visible from said mobile unit, and range information between said mobile unit and each said visible laser reflector to obtain said mobile unit positional information.

* * * * *